United States Patent
Casserly

(10) Patent No.: US 7,672,869 B2
(45) Date of Patent: Mar. 2, 2010

(54) ADVERTISEMENT SELECTION TECHNIQUE

(75) Inventor: James Casserly, Routio (FI)

(73) Assignee: Channel RD Oy, Nummela (FI)

(*) Notice: Subject to any disclaimer, the term of this patent is extended or adjusted under 35 U.S.C. 154(b) by 922 days.

(21) Appl. No.: 10/121,855

(22) Filed: Apr. 15, 2002

(65) Prior Publication Data

US 2002/0156680 A1    Oct. 24, 2002

Related U.S. Application Data

(63) Continuation of application No. PCT/FI00/00893, filed on Oct. 13, 2000.

(30) Foreign Application Priority Data

Oct. 15, 1999    (FI) .................................. 19992230

(51) Int. Cl.
*G06Q 30/00*    (2006.01)

(52) U.S. Cl. ............................ 705/14; 705/10; 705/22; 705/28

(58) Field of Classification Search .................. 705/14, 705/10, 22, 28
See application file for complete search history.

(56) References Cited

U.S. PATENT DOCUMENTS

| | | | | |
|---|---|---|---|---|
| 5,594,529 A | * | 1/1997 | Yamashita et al. ............. | 399/8 |
| 5,771,172 A | * | 6/1998 | Yamamoto et al. .......... | 700/106 |
| 5,822,735 A | * | 10/1998 | De Lapa et al. ................ | 705/14 |
| 5,878,401 A | * | 3/1999 | Joseph ......................... | 705/22 |
| 5,914,878 A | | 6/1999 | Yamamoto et al. | |
| 5,933,811 A | * | 8/1999 | Angles et al. .................. | 705/14 |
| 5,948,061 A | | 9/1999 | Merriman et al. | |
| 6,055,573 A | * | 4/2000 | Gardenswartz et al. ..... | 709/224 |
| 6,144,944 A | * | 11/2000 | Kurtzman et al. ............. | 705/14 |
| 6,317,722 B1 | * | 11/2001 | Jacobi et al. .................. | 705/14 |
| 2002/0004746 A1 | * | 1/2002 | Ferber et al. .................. | 705/14 |
| 2003/0133418 A1 | * | 7/2003 | Marshall et al. ............. | 370/310 |

FOREIGN PATENT DOCUMENTS

| | | |
|---|---|---|
| EP | 0749081 | 12/1996 |
| WO | WO 97/26729 | 7/1997 |
| WO | WO 99/52056 | 10/1999 |

OTHER PUBLICATIONS

Dasgupta, Prithviraj et al. "MAgNET: Mobile Agents for Networked Electronic Trading", IEEE Transactions on Knowledge and Data Engineering. vol. 11. No. 4. Jul./Aug. 1999.*

Dasgupta, Prithviraj et al. "A Supplier-Driven Electronic Marketplace Using Mobile Agents", Proc First Int'l Conf Telecommunications and Electronic Commerce. pp. 42-50. Nov. 1998.*

* cited by examiner

*Primary Examiner*—Michael Bekerman
(74) *Attorney, Agent, or Firm*—Barnes & Thornburg LLP

(57) ABSTRACT

A method for delivering advertising information (AI) from a server site (S) to a client (C). The including steps of 1) maintaining an advertising data base (ADB) comprising advertising records, each advertising record being associated with at least one item and/or category; 2) generating an item list (PL) containing at least one item to be acquired by the client (C); 3) retrieving, from the advertising data base (ADB), at least one advertising record which is associated with at least one item contained in the item list (PL) or a category of the item; and 4) using the retrieved advertising record for delivering advertising information (AI) from the server site (S) to the client (C).

23 Claims, 2 Drawing Sheets

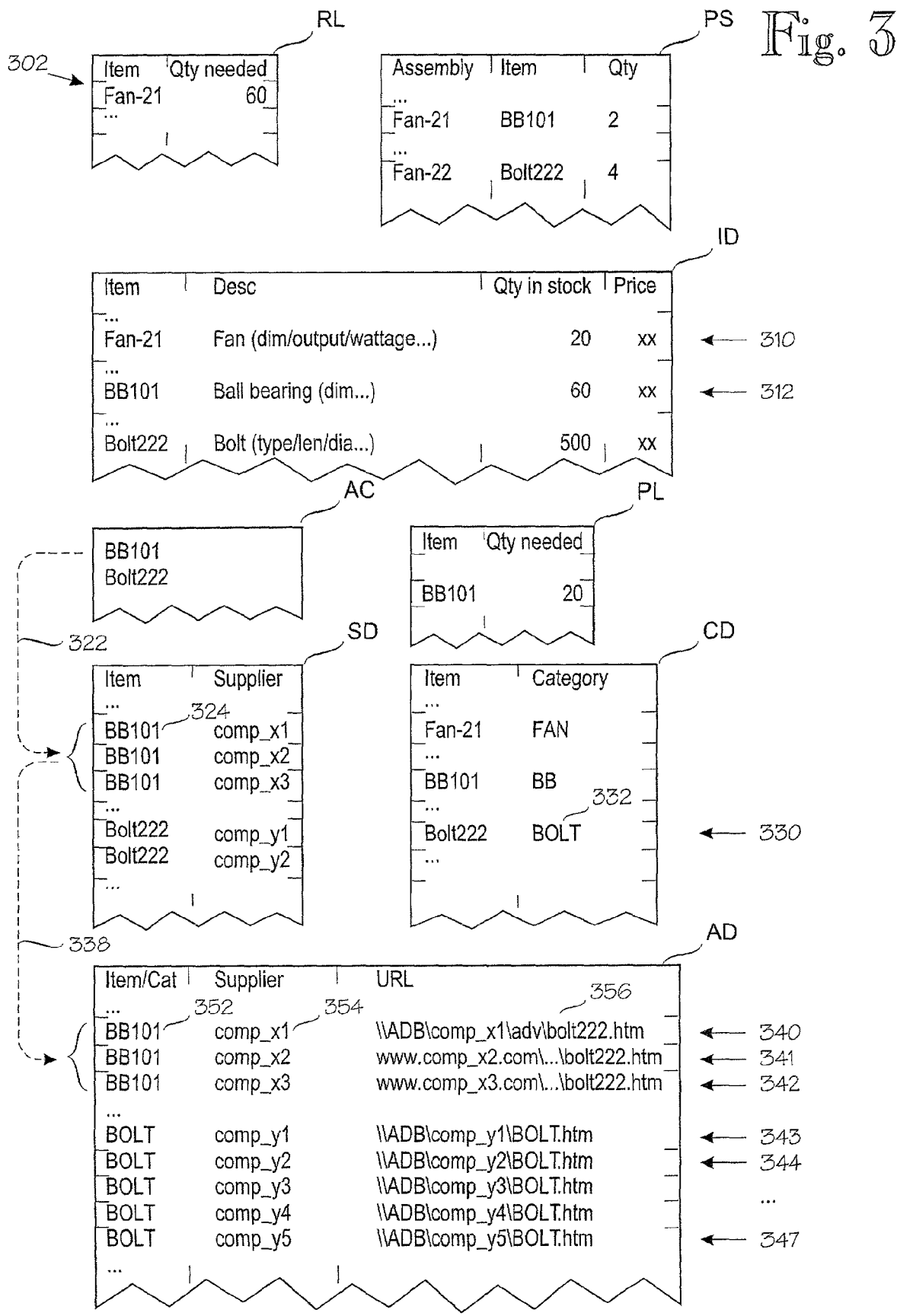

ADVERTISEMENT SELECTION TECHNIQUE

This application is a Continuation of International Application PCT/FI00/00893 filed on Oct. 13, 2000, which designated the U.S. and was published under PCT Article 21(2) in English.

BACKGROUND OF THE INVENTION

The invention relates to methods and equipment for delivering customized advertisements to customers.

A general problem with advertising is that most of the time, customers are flooded with advertisements which are irrelevant to their current activities. In other words, most advertisements are related to products or services in which the viewer is not at all interested, or the viewer could be interested in the advertisement, but only at a more appropriate time.

Advertisers are fiercely competing about a non-extendible resource, namely the perception ability of the potential customers. It has been estimated that one contemporary newspaper issue contains as much information as a typical 17th-century citizen received in his or her lifetime. As a result, the advertisers are in a zero-sum competition wherein one medium's or advertiser's gain is the loss of another.

Advertisers try to make educated guesses about the needs of their potential customers. For instance, when an Internet user views the web pages of an on-line vendor, the vendor may assume that the user in question has at least a mild interest in telecommunications, web browsing, etc, and consequently, the initial advertisements are typically selected from such items. An advertiser may employ a system which selects an advertisement from a database by using simple correlation between data entered by the user and the advertisement. For example, entering the word 'trousers' to a web search engine may result in an advertisement for a clothing company being displayed. When the user makes a purchase, his/her identity is stored and the next time s/he views the same vendor's web pages, s/he may be displayed an advertisement based on previous purchase behaviour. However, a hit to a certain web page or an on-line purchase from the vendor gives little or no actual information on the user's future behaviour. For instance, a business may have been buying computers regularly, but in fact their last computer purchase was the last one needed in the foreseeable future, and no further computers are needed. Thus prior art advertisement delivery mechanisms are based on predictions of user behaviour which are extrapolated from current or past behaviour. Such extrapolation may lead to false conclusions, which is why prior art advertisement delivery mechanisms provide irrelevant information and thus waste economical and technical resources.

DISCLOSURE OF THE INVENTION

An object of the invention is to provide a mechanism for advertisement delivery which provides more relevant information than the prior art mechanisms do. This object is achieved with a method and equipment which are characterized by what is disclosed in the attached independent claims. Preferred embodiments of the invention are disclosed in the attached dependent claims.

The invention is based on discovering the problem and finding a solution for it. The solution is based on the idea that advertising is based, at least partially, on the calculated purchase plans of the targeted audience, i.e. the client. An advantage of the invention is that the client need not provide information in person as to what the client intends to acquire. This information can be calculated or derived from a business logic which has access to data concerning the total operations of the client organization.

In the following description, the term 'item' refers to a product, service and/or information which the client (organization) intends to acquire. It should be understood that 'acquiring' is not limited to purchasing. For example, the client can be a transport company which leases or rents vehicles. Several related items may constitute a category. The categories may be arranged hierarchically. For example, an item may be a "ball bearing of type xxx", whereby the category is "ball bearings", which in turn may fall under the higher-level category of "bearings", etc. An essential idea of the invention is selecting advertising information related to at least one item which the client intends to acquire. Alternatively, advertising information be selected from the category which comprises the item in question.

According to one aspect of the invention, there is provided a method for delivering advertising information from a server site to a client (as an organization). According to another aspect of the invention, there is provided a server arrangement for delivering advertising information to the client. The server site is the location from which advertising information is delivered. Typically the site comprises at least one Internet server and operator (support personnel). The client organization comprises one or more client sites, each client site comprising client personnel and a client terminal which is at least temporarily connected to the server site. A prime example of a client terminal is a personal computer with an Internet browser.

'Advertising information' should be interpreted broadly. Because the invention enables the delivery of highly relevant advertising to the client, an advertisement does not have to be visually attractive, and consequently, a mere indication of a favourable price or a short delivery time or some other indication may suffice for affecting the client's decision. Advertising information comprises explicit or implied advertisements and parts thereof. Within the context of this application, explicit advertising means delivering one or more complete advertisements, whereas implied advertising means delivering one or more links to express advertisements.

A method according to the invention comprises the steps of:

1) maintaining an advertising database comprising advertising records, each advertising record being associated with at least one item or the corresponding category. For implementing the invention, the operator should maintain a database wherein each record links one item or category with relevant advertising information, such as locally-stored complete advertisements, price/delivery information and/or links to advertisements stored in external locations.

2) generating an item list which indicates or contains a set of items, i.e. at least one item, to be acquired by the client. In this context, the 'client' means the client as an organization, not just the person who is operating the client terminal. In other words, advertisement selection may be based on information obtained from a designer, but the actual advertisement may be delivered to a person in charge of purchases. In order to have information on the actual (versus assumed) purchase plans of the client, there must be a mechanism for producing a client-specific list of required or planned acquisitions. Such a list will be called a planning list (PL). Additionally, the planning list must be made available to the server site operator. This presents a problem which has simultaneous technical and economical aspects. The problem has a technical aspect, because the planning list must reflect accurately what the client plans to acquire. The problem is also an economical one, because the client must have a sufficient incentive to publish his/her purchase plans. The technical aspect of the problem can be solved for example by providing the client with a materials planning program, or MRP program, which outputs the item list. It should be noted that, traditionally, 'MRP' stands for Manufacturing Resource Planning, but the invention is not limited to manufacturing. Instead, the invention is applicable to acquiring (purchasing, renting or leasing) any resources (products, services and/or information). From here on, the materials planning program will be called 'business logic' (BL). The economical aspect of the problem can be solved by providing the BL program to the client at a reduced cost or free of charge. The operator can compensate for lost profits by selling accurately targeted advertising. Alternatively, providing the client with accurate price information from different competing sources may induce the client to actually purchase the BL program according to the invention or to make available information from an existing business logic program to this purpose.

The operator must ensure that the item information is compatible with the item information in the advertising database. Ideally, the database of the BL program for the client site should use identical item numbers with the item information in the advertising database of the server site. If this is not possible, the client's BL program or the server site may employ a translation table for converting between dissimilar item/category codes.

3) retrieving from the advertising data base at least one advertising record which is associated with at least one item contained in the item list or a category of that item. The section of the mechanism according to the invention which performs this step will be call 'advertising logic' (AL). The client may expressly indicate that s/he wishes to receive advertisements in a certain category. If this is the case, the server site may select any adverting material from the category. However, if the client's item list indicates only one or more specific items, the server must decide if the selected advertising record should relate to the items in question, or to the related category. For instance, if the BL calculates that the client will purchase a product with no compatible replacements, there is little point in advertising the same product, and better use of technical and economical resources is achieved by advertising another product in the same category. However, if the product is a commodity item, the client is very much benefited by accurate price/delivery information. This decision will be further described below.

4) using the selected advertising record for delivering advertising information from the server site to the client. The final step of delivering customized advertising information can be implemented by providing the client with one or more complete advertisements, one or more links to related advertisements, or one or more pieces of useful, product/service/category-related information, such as prices or delivery information.

As already stated, prior art advertisement delivery mechanisms are based on the client's identity and current and previous behaviour. The advertisement delivery mechanism according to the invention is based on information about the client's actual acquisition plans whether they are actually known to the client or not. Naturally, these two mechanisms can be combined. In other words, an advertisement delivery mechanism according to the invention is not necessarily limited to selecting an advertisement on the basis of the client's item list, but the mechanism may use the client terminal user's identity or the general type of the client's business as additional sources of information.

According to one embodiment of the invention, the one or more advertising records are selected at random, among the advertising records which are associated with at least one item/category in the client's item list. According to various preferred embodiments, the one or more advertising records are selected by means of more advanced selection algorithms, as will be described later in more detail.

According to yet another preferred embodiment of the invention, the business logic program is installed at the server site. Such an arrangement facilitates extracting information from the client's item list to the benefit of the advertising logic. It also protects the business logic from software piracy.

BRIEF DESCRIPTION OF THE DRAWINGS

The invention will be described in more detail by means of preferred embodiments with reference to the appended drawing wherein:

FIG. 3 illustrates various data structures used in the system of FIG. 1.

DETAILED DESCRIPTION OF THE INVENTION

Figure 1:
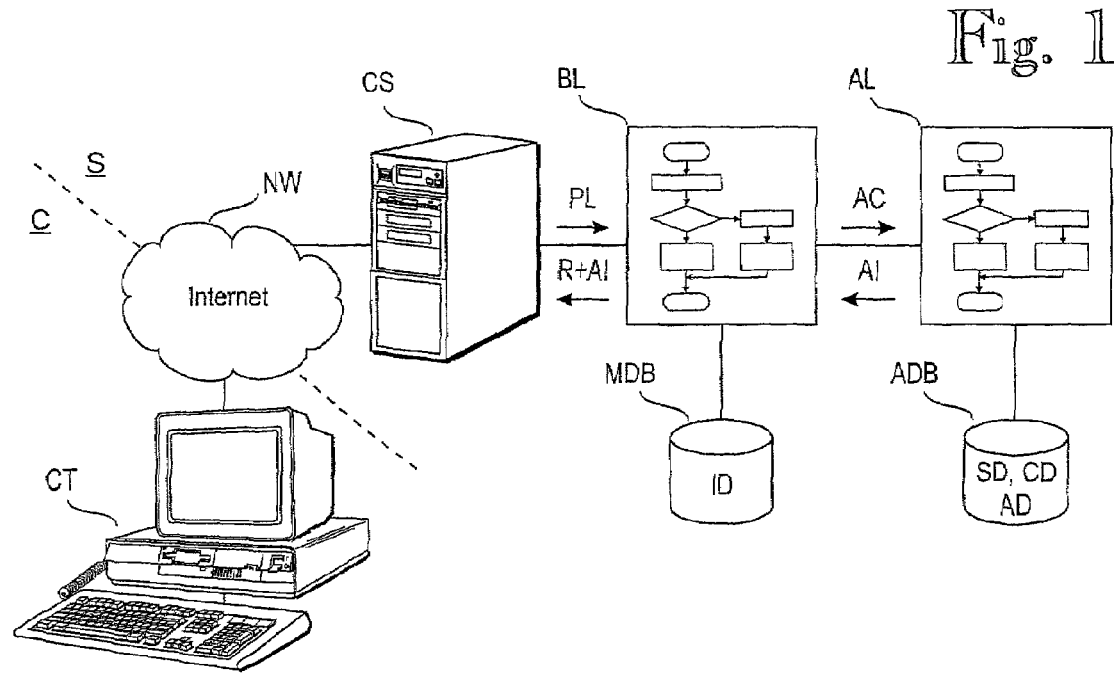
FIG. 1 is a block diagram illustrating one embodiment of the invention.

FIG. 1 is a block diagram illustrating a preferred embodiment of the invention. There are two main sections, a client site C and a server site S. The client site comprises a client terminal CT, which can be a conventional desktop computer running an Internet browser. The client terminal CT is connected to the server site via a telecommunication network NW. The network can be for example the Internet or a closed subnetwork, commonly called intranet or extranet. The server site S comprises a communications server CS, a business logic BL (comprising e.g. the materials resource planning, or MRP, program) with its associated materials data base MDB, and an advertising logic AL with its advertising data base ADB. In lightly-loaded systems, the logic sections BL and AL and the databases MDB and ADB can be installed in the same computer which acts as the communication server CS. On the other hand, a heavily-loaded system may require several computers for performing some or all of the functions at the server site.

Figure 2:
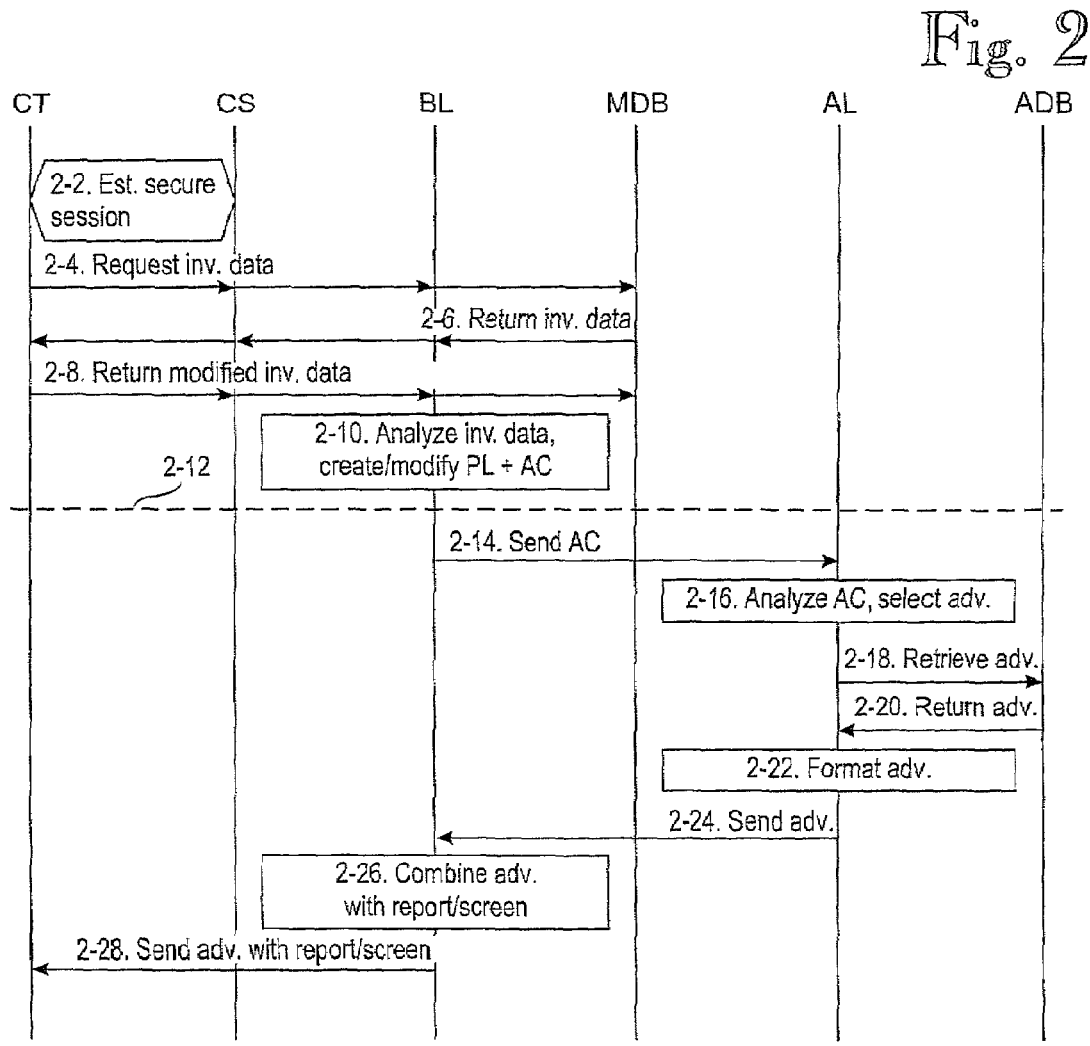
FIG. 2 is a signalling diagram illustrating one possible set of events in a system as shown in FIG. 1.

FIG. 2 is a signalling diagram illustrating one possible set of events in a system as described above. FIG. 2 should be studied in connection with FIG. 3 which illustrates the various data structures used in the system. In step 2-2 an Internet session is established between the client terminal CT and the communication server CS. (This step comprises several substeps, such as authenticating the user of the client terminal CT and establishing a secure transport layer, but all such substeps are well known to those skilled in the art.) In step 2-4 the user of the client terminal CT navigates to a web page relating to that particular user's business data. For example, a salesperson may be entering a sales order for a particular item, or a designer may store a construction of a new product. The communication server CS conveys the user's choice to the business logic BL which sends to the materials data base MDB a request for inventory data. In step 2-6 the MDB returns the requested inventory data to the BL which in turn conveys it via the CS to the client CT. In step 2-8 the user of the client terminal CT has considered the available information and s/he places and sends, via the communication server CS instructions (such as a filled form) for updating the MDB. Steps 2-4 through 2-8 can be varied in many ways. For example, the client site user may send an explicit PL list, or s/he may send implicit information on the basis of which a PL list can be calculated. As an example of such implicit information, let us consider a case where the client has 150 ball bearings in stock and s/he enters a sales order for 20 units, each requiring 8 ball bearings. Based on this implicit information, the BL can calculate that the client will soon purchase more ball bearings, although the client site user may not be aware of the fact that more ball bearings will be needed in the near future. In other words, it is essential that after step 2-8 the business logic BL has access to information on the basis of which the client's future behaviour can be predicted accurately (not just assumed). In step 2-10 the business logic BL analyzes the available inventory data, sales/purchase orders, etc. and creates a PL list.

FIG. 3 shows, along with some other files and databases, a list of requirements (RL) for a manufacturing company that makes fans. The requirements list RL can be based on sales forecasts and sales orders, but it can include other items as well. The requirement list RL is typical of lists that may be maintained by a business logic, either directly or calculated from other information of the organization. To keep the illustration compact, the RL list in FIG. 3 comprises only one required item, and the list does not show other related information, such as date required or a source of requirement (e.g. a sales order or a sales forecast, etc.).

The RL list comprises a fan of type Fan-21, of which 60 pieces will be needed. The corresponding item code 302 is used to retrieve data related to this fan from an inventory data table ID. Reference number 310 denotes an ID table record which comprises data for Fan-21. In this example, the inventory data comprises a description, the quantity in stock and the price of one fan. (In reality, the inventory database ID would comprise far more detailed information, such as a shelf code, consumption per unit of time, etc., but such details are not relevant for understanding the present invention.) Since the client needs 60 fans and the inventory data table ID shows that the quantity in stock is 20 pieces, the client has to manufacture 40 pieces more in order to fulfil his/her customer's requirements.

By considering a table of product structures PS, it can be seen that for each Fan-21, there is a requirement for 2 bearings of type BB101. Record 312 of the inventory data table ID shows that there are 60 pieces of BB101 in stock, but the requirement for BB101 in the near future is 2 times 40 pieces, or 80 pieces. This leaves a net requirement for 20 pieces. On this basis the BL will add item BB101 to the planning list PL, and the item BB101 can also be marked as an advertising candidate by adding it to the advertising candidate list AC.

The inventory data table ID also includes a bolt of type Bolt222. The quantity in stock is 500 pieces. Currently there is no entry for the Bolt222 in the planning list PL. A product designer at the client site C (or anywhere in the client organization) has added Bolt222 to a product structure for another fan of type Fan-22. This addition was made through a part of the BL that controls product structures. As a result of this change, the BL adds the Bolt222 to the advertising candidate list AC, the logic being driven by past sales of Fan-22.

In practice, the business logic will be considering many more factors than are illustrated here. For instance, the time frame of purchasing, approved suppliers, minimum stock levels, etc. should be taken into account. These factors and the detailed operation of a business logic are well known those skilled in the art, and the invention is not limited to the simplistic illustration above. As a further alternative, the client may generate records in the PL list directly. For instance, if the client organization has not implemented all the features of a business logic, then the planned purchases could be recorded manually.

The dashed line 2-12 in FIG. 2 indicates a possible break in the sequence of events. The process may be interrupted at step 2-12 (or at any time between steps 2-10 and 2-28). For example, the client site user who initiated the session in step 2-2 may terminate the session, and a second user may initiate a new session, in which case the selected advertisement(s) will be sent to the second operator. The advertising logic AL may even consult an employee database (not shown separately) and determine that the current client site operator does not make purchase decisions, in which case the advertisement would, during a subsequent session, be sent to someone in charge or purchasing.

Next, in step 2-14, the business logic BL sends the advertising candidates list AC to the advertising logic AL. In step 2-16 the advertising logic AL analyzes the list of advertising candidates AC for selecting at least one advertisement. At its simplest, the advertisement selection algorithm may be implemented by selecting one advertisement at random, although preferred selection algorithms will be described later.

Let us first assume that the advertising logic AL decides to advertise ball bearing BB101. As indicated by arrow 322, the advertising logic AL makes use of a supplier data table SD which lists three possible suppliers for BB101, denoted by reference numeral 324, namely companies comp_x1, comp_x2 and comp_x3. Next, as indicated by arrow 338, the advertising logic AL consults an advertising data table AD which has a record for each of the three suppliers for this particular bearing. For example, record 340 comprises an item code 352 and a supplier code 354 for BB101. Additionally, the record 340 comprises a URL (universal resource locator) 356 for indicating the location of the corresponding advertisement. The URL field 356 of the record 340 begins with \\ADB, wherein 'ADB' is the reference sign for the advertising database (see FIG. 1). This means that the advertisement for item BB101 by company comp_x1 is stored locally in the ADB, whereas the URLs for the next two suppliers comp_x2 and comp_x3 point to the www pages of the respective suppliers.

Let us next assume that the advertising logic AL decides to advertise Bolt222 instead of (or in addition to) the BB101. In the example shown in FIG. 3, the bolt Bolt222 is such a mundane item that, although the supplier data table SD gives two possible suppliers (comp_y1 and comp_y2), neither has a specific advertisement for a specific bolt. In other words, the advertising data table AD has no records with item code 'Bolt222'. In such a case the advertising logic AL consults a category data table CD, which has a record 330 indicating that the category 332 for Bolt222 is BOLT. The advertising logic AL again consults the advertising data table AD and finds five records 343-347 for suppliers of category BOLT. However, the supplier data table SD shows that only two records, namely 343 and 344, relate to suppliers of Bolt222. Here the advertising logic AL has two choices. It may select an advertisement from any supplier of category BOLT (records 343-347), or it may restrict the selection to the suppliers that actually supply the type of bolt the client is about to purchase, i.e. Bolt222 (records 343 and 344).

The outcome of the analyzing step 2-16 is a set of one or more URLs, e.g. the URL 356 of the advertising record 340. In step 2-18 the advertising logic AL uses the set of URLs for retrieving advertising information AI. If the URL points to the local advertising database ADB (see e.g. URL 356 of record 340), the advertising information is retrieved locally. On the other hand, if the URL points to an external location (see e.g. the URL of records 341 and 342), the advertising information is retrieved via an external network, most probably via the Internet.

In step 220 the advertising database ADB or the external network returns the requested advertising information AT. In step 2-22 the advertising logic AL formats the advertising information AI. As an example, the advertising logic AL may combine a logo of a supplier with some actual pricing information into one compact image in a suitable format, such as GIF or JPG. In step 2-24 the advertising logic AL sends the formatted advertising information AT to the business logic BL, which combines it with a business report/web screen R in step 2-26. Preferably, the advertising information AT and the business report/web screen R are combined into a page which can be viewed with the client site's Internet browser. For example, the AI+R combination may be in HTML (hypertext mark-up language) or XML (extendible mark-up language). In step 2-28 the business logic BL sends the AI+R combination to the client site C.

One aspect of the invention as described above is the generation of the advertising data AD that needs to be transmitted to the client site. This AD list can be empty, or it can have one record or have a multitude of records. However, in typical use an empty AD list or one with only one record in it will rarely occur, and such cases can be handled simplistically. Accordingly, there is usually a requirement to select from the multitude of records a subset of preferred advertising records to be used. According to the design of the screen that the client will view (such as a web page), there will be space reserved for one or more advertisements. In the following example, a case of selecting one advertisement will be described, but the same mechanism is capable of retrieving two or more advertisements, if required.

A primary factor in the selection of an advertisement is timing. The closer in time that an advertisement is to the potential purchase date by a buyer at the client site, the more likely that the advertisement will be effective, i.e. that it will result in a response from the user. The above-described business logic for creating the PL list also has access to the time schedule of the planned purchases. The time schedule can be calculated by subtracting the delivery time of the item from the date that it is required in the inventory. The delivery time is either entered directly by the client for individual items or groups of items, or is available from past purchasing behaviour.

Because it would not be beneficial to endlessly repeat the same advertisement, it is necessary to include other criteria for advertisement selection. The system would prove most effective when combining the advertisement selection process with prior art systems of examining current user activity. For instance, if a buyer started to create a purchase order for a certain item, then it would be best to select from the advertising information an advertisement that was related to the item being purchased.

An advertisement can be selected by giving each advertisement a ranking score, and then selecting the advertisement having the highest ranking score. The ranking is achieved by taking a factor such as time from last display and giving the factor a weighting which adjusts the importance of the factor among all factors. Thus the ranking is the sum for all factors of the product of factor and weighting.

Factors that can be included:
1. days before a planned purchase
2. days after a planned purchase (i.e. planned purchase is late)
3. whether or not the client organization has previously purchased from this advertiser
4. advertisement display times
5. time since last advertisement display
6. advertisement success index (percentage of shows leading to user interaction or hit)
7. whether or not the advertisement is from a preferred (or non-preferred) supplier
8. whether or not the advertisement is subject to a campaign premium from the advertiser
9. whether or not the advertisement is related to current user activity
10. whether or not the advertisement is related to a registered user profile.

By adjusting the weighting of each factor, the server operator can set advertisement selection to his preference.

In the embodiment described in connection with FIGS. 1 to 3, the business logic BL (the MRP software and the routines for analyzing the planning list PL and for creating the advertising candidate list AC) is located the server site S. This arrangement, although not necessary, has several advantages over an arrangement wherein the BL is located at the client site C. For example, the server site operator can be reasonably confident that the client's planning list PL contains accurate information on future purchases. Also, the business logic is very well protected against illegal copying, and it easy to update the various databases because they are located in a central location. The client's advantage is that s/he only needs an Internet browser but no storage space for the business logic or the associated databases.

Although the invention has been described in connection with preferred embodiments, it is not limited to these examples, but it may be varied within the scope of the appended claims.

The invention claimed is:

1. A method for formulating advertising information for delivery to a client organization, the advertising information relating to an item associated with an acquisition plan of the client organization, the method comprising:

maintaining a centralized advertising data base at a centralized advertising server, the centralized advertising data base comprising a plurality of advertising records, each of said advertising records being associated with at least one item and a supplier for the at least one item, wherein the plurality of advertising records is associated with a plurality of suppliers, and wherein the centralized advertising server is configured to serve multiple client terminals operated by multiple client organizations, and wherein the plurality of advertising records comprises one or more subsets of advertising records such that each subset of advertising records relates to an item having multiple alternative suppliers;

maintaining inventory records for the client organization, each inventory record indicating an inventory level of an item in the client organization's inventory;

providing an acquirement planning program for use by the client organization, the acquirement planning program being configured to generate an item list containing at least one item to be acquired by the client organization in accordance with the acquisition plan, wherein the generating of the item list comprises:

receiving the acquisition plan from the client organization determining net requirements of the client organization based on the acquisition plan and the inventory records for the client organization; and generating the item list based on the determined net requirements;

conveying the item list to the centralized advertising server;

retrieving, from the advertising data base, at least one advertising record which is associated with at least one item contained in the generated item list, wherein, for an item having multiple alternative suppliers, the centralized advertising server selects one of the multiple alternative suppliers;

selecting advertising information by the centralized advertising server based on at least one retrieved advertising record;

delivering the formulated advertising information to the client organization; and combining the delivered advertising information with other information provided by the acquirement planning program to generate a client-specific business report, wherein said combining is controlled by the acquirement planning program;

wherein the acquisition plan includes information indicating at least one item to be acquired in the future by the client organization which is determined based on at least one product to be delivered by the client organization in the future.

2. The method of claim 1, further comprising selecting a subset of advertising records for use in the formulating of advertising information if the result of the retrieving from the advertising database is a plurality of records.

3. The method of claim 2, wherein the selecting of the subset of advertising records comprises weighted ranking of the records in the plurality of records.

4. The method of claim 3, wherein one factor in the weighted ranking is the length of time until or since a planned time of acquisition of the item in question or the planned time for placing an order for the acquisition of the item.

5. The method of claim 1, further comprising:
maintaining the centralized advertising data base on a first computer;
maintaining the acquirement planning program on a second computer; and
maintaining, on a third computer, a client program for interacting with the second computer to maintain current client business data,
wherein the generated item list is conveyed from the second computer to the first computer, and
wherein the advertising information is delivered from the advertising server via the Internet.

6. The method of claim 1, wherein the generated item list is based on a planning list derived from a calculation of a number of items to be acquired by the client organization as a function of the determined net requirements.

7. The method of claim 1, wherein the acquisition plan of the client organization relates to at least one product produced by the client organization and the generation of the item list comprises analyzing a product structure indicating several components of the at least one product produced by the client organization.

8. The method of claim 1, further comprising:
determining that an item on the item list is not associated with an advertising record in the centralized advertising data base;
determining a category for an item on the item list that is not associated with an advertising record;
providing the determined category of items to the advertising server; and
retrieving from the centralized advertising data base at least one advertising record which is associated with at least one supplier of the determined category of items.

9. The method of claim 1, wherein the information corresponding to the retrieved advertising record comprises a URL that can be utilized to retrieve advertising information.

10. A system for formulating advertising information for delivery to a client organization, the advertising information relating to an item associated with an acquisition plan of the client organization, the system comprising:

centralized memory including an advertising data base comprising a plurality of advertising records, each of said advertising records being associated with at least one item and a supplier for the at least one item, wherein the plurality of advertising records is associated with a plurality of suppliers and wherein the centralized memory is configured to serve multiple client terminals operated by multiple client organizations, and wherein, the plurality of advertising records comprises one or more subsets of advertising records such that each subset of advertising records relates to an item having multiple alternative suppliers;

memory including a database of inventory records for the client organization, each inventory record indicating an inventory level of an item in the client organization's inventory;

memory including an acquirement planning program to be executed on a processor, the acquirement planning program comprising software configured to generate an item list containing at least one item to be acquired by the client organization in accordance with the acquisition plan, wherein the software configured to generate the item list comprises:

means for receiving the acquisition plan from the client organization;

means for determining net requirements of the client organization based on the acquisition plan and inventory records for the client organization; and means for generating the item list based on the determined net requirements;

memory including means for retrieving, from the advertising data base, at least one advertising record which is associated with at least one item contained in the generated item list, wherein, for an item having multiple alternative suppliers, one of the multiple alternative suppliers is selected;

memory including means for formulating advertising information based on at least one retrieved advertising record;

memory including means for delivering the formulated advertising information to the client organization; and memory including means for combining the delivered advertising information with other information provided by the acquirement planning program to generate a client-specific business report, wherein the combining is controlled by the acquirement planning program, wherein the acquisition plan includes information indicating at least one item to be acquired in the future by the client organization which is determined based on at least one product to be delivered by the client organization in the future.

11. The system of claim 10, further comprising memory including means for selecting a subset of advertising records for use in the formulating of advertising information if the result from the retrieving means is a plurality of records.

12. The system of claim 11, wherein the means for selecting the subset of advertising records comprise means for performing weighted ranking of the records in the plurality of records.

13. The system of claim 12, wherein one factor in the weighted ranking is the length of time until or since the planned time of acquisition of the item in question or the planned time for placing an order for the acquisition of the item.

14. The system of claim 10, wherein,
the centralized advertising data base resides on a first computer;
the acquirement planning program resides on a second computer;
a third computer stores a client program for interacting with the second computer to maintain current client business data; and
the system further comprises memory including means for conveying the generated item list from the second computer to the first computer and means for delivering the advertising information from the first computer via the Internet.

15. The system of claim 10, wherein the generated item list is based on a planning list derived from a calculation of a number of items to be acquired by the client organization as a function of the determined net requirements.

16. The system of claim 10, wherein the acquisition plan of the client organization relates to at least one product produced by the client organization and the means for generating the item list comprises means for analyzing a product structure indicating several components of the at least one product produced by the client organization.

17. The system of claim 10, further comprising:
memory including means for determining that an item on the item list is not associated with an advertising record in the centralized advertising data base;
memory including means for determining a category for an item on the item list that is not associated with an advertising record;
memory including means for providing the determined category of items to the advertising server; and
memory including means for retrieving from the centralized advertising data base at least one advertising record which is associated with at least one supplier of the determined category of items.

18. The system of claim 10, wherein the information corresponding to the retrieved advertising record comprises a URL that can be utilized to retrieve advertising information.

19. A computer program product, stored on a computer readable medium and executable in a computer system, the computer program product being configured to formulate advertising information for delivery to a client organization, the advertising information relating to an item associated with an acquisition plan of the client organization, the computer program product comprising program code for carrying out the following steps when the program product is executed in the computer system:
maintaining centralized advertising data base at an centralized advertising server, the centralized advertising data base comprising a plurality of advertising records, each of said advertising records being associated with at least one item and a supplier for the at least one item, wherein the plurality of advertising records is associated with a plurality of suppliers, and wherein the centralized advertising server is configured to serve multiple client terminals operated by multiple client organizations and, wherein, the plurality of advertising records comprises one or more subsets of advertising records such that each subset of advertising records relates to an item having multiple alternative suppliers;
maintaining inventory records for the client organization, each inventory record indicating an inventory level of an item in the client organization's inventory;
maintaining an acquirement planning program, the acquirement planning program being configured to generate an item list containing at least one item to be acquired by the client organization in accordance with the acquisition plan of the client organization, wherein said generating the item list comprises:
receiving the acquisition plan from the client organization comprising information related to future requirements of the client organization;
determining net requirements of the client organization based on the acquisition plan and the inventory records for the client organization; and
generating the item list based on the determined net requirements;
conveying the item list to the centralized advertising server;
retrieving, from the centralized advertising data base, at least one advertising record which is associated with at least one item contained in the generated item list, wherein, for an item having multiple alternative suppliers, the centralized advertising server selects one of the multiple alternative suppliers;
formulating advertising information based on at least one retrieved advertising record;
delivering the formulated advertising information to the client organization; and
combining the delivered advertising information with other information provided by the acquirement planning program to generate a client-specific business report, wherein said combining is controlled by the acquirement planning program,
wherein the acquisition plan includes information indicating at least one item to be acquired in the future by the client organization which is determined based on at least one product to be delivered by the client organization in the future.

20. The computer program product of claim 19, wherein the generated item list is based on a planning list derived from a calculation of a number of items to be acquired by the client organization as a function of the determined net requirements.

21. The computer program product of claim 19, wherein the acquisition plan relates to at least one product produced by the client organization, and the computer program product comprises program code means for analyzing a product structure indicating several components of the at least one product produced by the client organization.

22. The computer program product of claim 19, wherein the program code further carries out the steps of:
determining that an item on the item list is not associated with an advertising record in the centralized advertising data base;
determining a category for an item on the item list that is not associated with an advertising record;
providing the determined category of items to the advertising server; and
retrieving from the centralized advertising data base at least one advertising record which is associated with at least one supplier of the determined category of items.

23. The computer program product of claim 19, wherein the information corresponding to the retrieved advertising record comprises a URL that can be utilized to retrieve advertising information.

* * * * *